E. T. ROBINSON.
DISAPPEARING LUGGAGE CARRIER FOR AUTOMOBILES.
APPLICATION FILED OCT. 5, 1908.
917,362.
Patented Apr. 6, 1909.
2 SHEETS—SHEET 1.
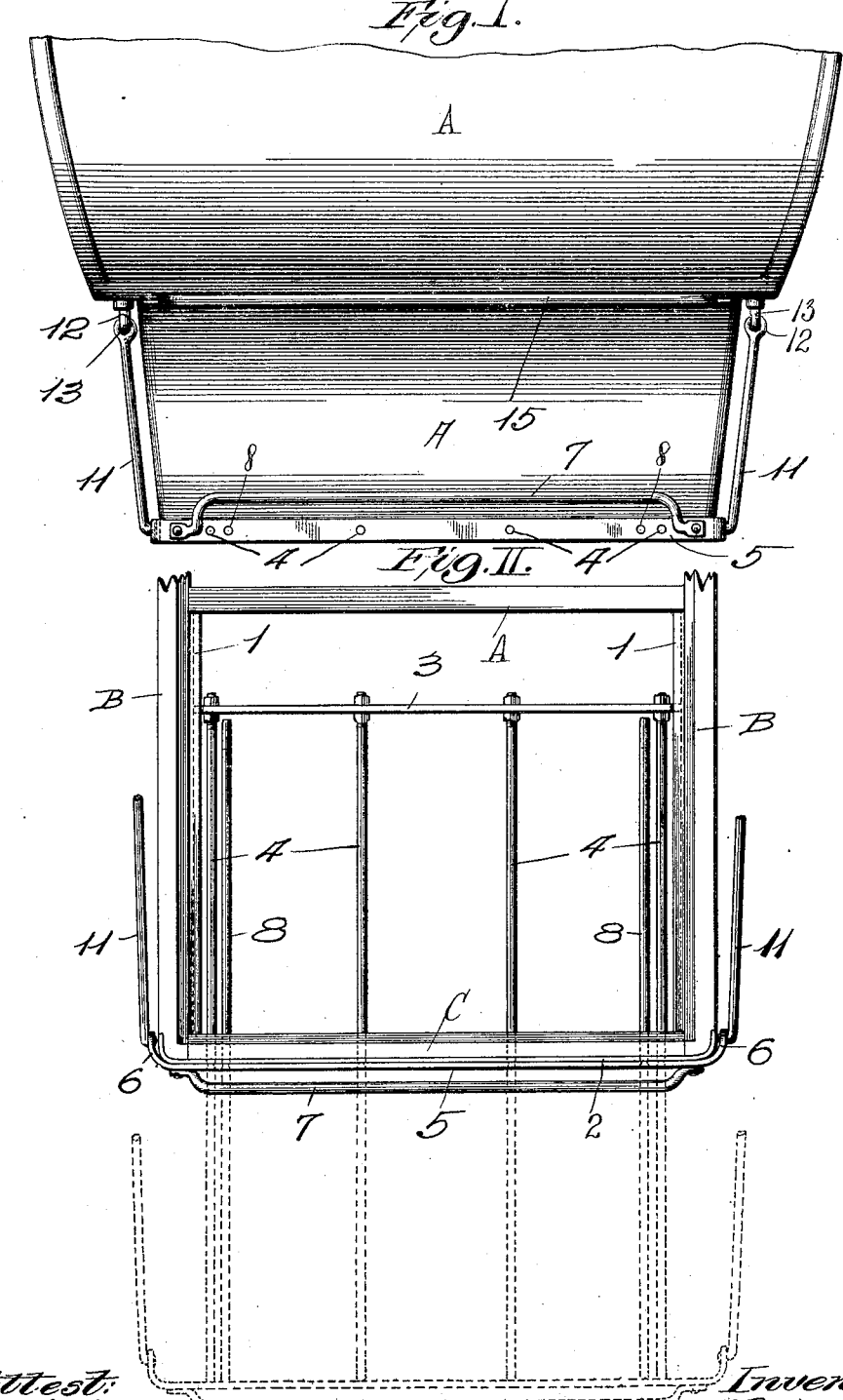

E. T. ROBINSON.
DISAPPEARING LUGGAGE CARRIER FOR AUTOMOBILES.
APPLICATION FILED OCT. 5, 1908.
917,362.
Patented Apr. 6, 1909.
2 SHEETS—SHEET 2.
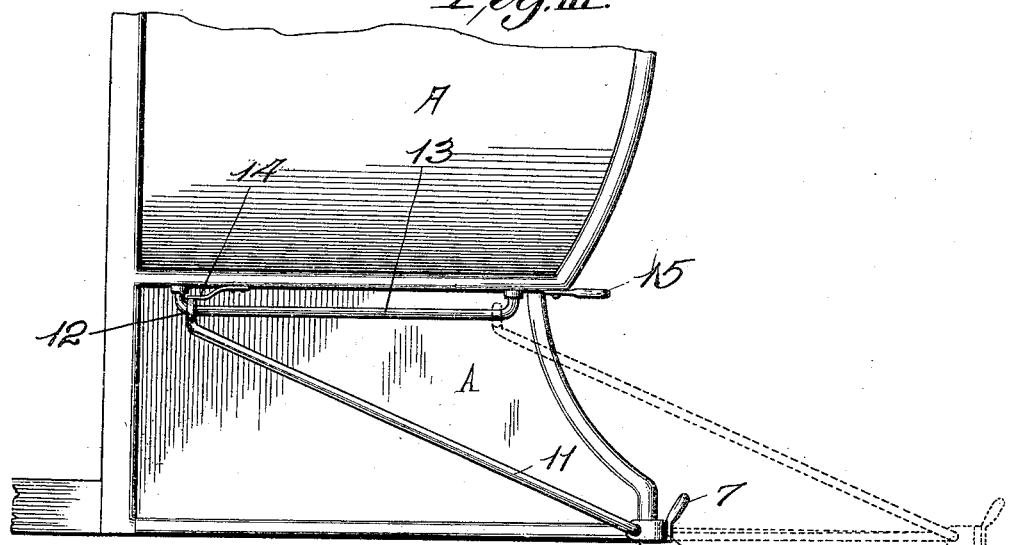
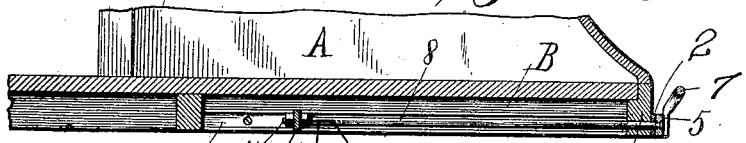
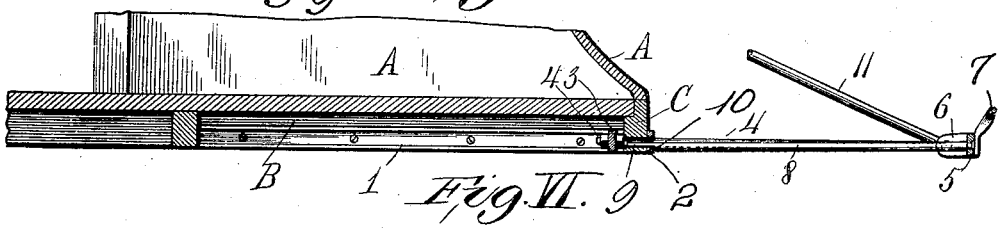
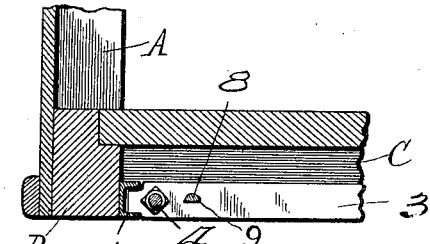

UNITED STATES PATENT OFFICE.

EDWARD T. ROBINSON, OF ST. LOUIS, MISSOURI, ASSIGNOR TO ST. LOUIS CAR COMPANY, OF ST. LOUIS, MISSOURI, A CORPORATION.

DISAPPEARING LUGGAGE-CARRIER FOR AUTOMOBILES.

No. 917,362.  Specification of Letters Patent.  Patented April 6, 1909.

Application filed October 5, 1908. Serial No. 456,296.

*To all whom it may concern:*

Be it known that I, EDWARD T. ROBINSON, a citizen of the United States of America, residing at the city of St. Louis, in the State of Missouri, have invented certain new and useful Improvements in Disappearing Luggage-Carriers for Automobiles, of which the following is a full, clear, and exact description, reference being had to the accompanying drawings, forming part of this specification.

My invention relates to a carrier applied to an automobile or a similar vehicle, and by which trunks or other luggage may be supported, the carrier being so constructed and applied to the vehicle, as to be readily movable into an extended position and held for service, and into a position within the vehicle, when released and out of service.

Figure I is a rear elevation of a portion of an automobile body with my luggage carrier applied thereto. Fig. II is a top or plan view of the underframe of the automobile body and my luggage carrier mounted therein the extended portion of the luggage carrier being shown in dotted lines. Fig. III is a side elevation of the rear portion of the automobile body and my luggage carrier, the carrier being illustrated in full lines in its forward position, and in dotted lines in its rear or extended position. Fig. IV is a vertical section taken longitudinally through the automobile body and my luggage carrier with the carrier illustrated in its forward position. Fig. V is a similar view to Fig. IV with the carrier extended. Fig. VI is a vertical cross section through portions of the automobile body and luggage carrier. Fig. VII is an enlarged perspective view of the inner or free end of one of the stop rods present in the luggage carrier.

In the accompanying drawings:—A designates the body of an automobile having an underframe comprising side rails B, and a rear rail C.

1 designates guide bars attached to the inner sides of the side rails B and which are preferably of channel shape.

2 is a wear strip secured to the rear rail C at its outer side, this wear strip being extended the full length of the rear rail and having its ends overlapped onto the side rails B, as seen in Fig. II.

3 designates an inner cross bar extending transversely of the automobile body between the side rails B the ends of which are arranged to move rearwardly and forwardly in the guide bars 1. The cross bar 3 is a member of a luggage supporting frame which includes a series of rods 4 attached at their rear ends to the cross bar and which extend longitudinally of the automobile body through the rear rail C, the wear strip 2, and are attached at their rear or outer ends to a cross bar 5 that is also a member of the luggage supporting frame. The outer cross bar 5 extends the full width of the automobile body and it is provided at its ends with forwardly projecting ears 6.

7 is a hand rod attached to the outer cross bar of the luggage supporting frame and by which the frame may be moved rearwardly into an extended position or moved forwardly in which movements the rods 4 slide through the cross rails C and the wear strip 2, while the forward cross bar 3 operates at its ends in the guide bars 1.

It may be here mentioned that when the frame is moved into an extended position, its forward cross bar, by being in engagement with the guide bars 1, is so held, as to cause it to resist upward movement of the forward ends of the luggage supporting frame when weight is imposed upon the extended portion of the frame.

8 designates stop rods, the rear ends of which are mounted in the outer cross bars 5 of the luggage supporting frame, and which are adapted to move backwardly and forwardly with said frame. These stop rods extend loosely through the rear underframe rail C and the wear strip 2 parallel with the frame rods 4, but the forward ends of the stop rods are free of connection with the forward portion of said frame. Each of the stop rods is cut away or notched at its forward free end, as seen at 9, see Figs. IV to VII inclusive, whereby a shoulder 10 is provided at the bottom of the rod and at a distance from the termination of the rod. When the luggage supporting frame is moved into an extended position, the forward ends of the stop rods are permitted to descend due to the notching thereof, in order that the shoulders of the rods may occupy positions adjacent to the wear strip 2, see Fig. V, thereby restraining the luggage supporting frame from forward movement, while it is in service.

11 designates frame supporting rods that are loosely mounted at their rear ends in the ears 6 of the rear luggage supporting frame bar 5 and are located exteriorly of the automobile body. These supporting rods extend forwardly and upwardly from said ears 6 and they are provided at their forward ends with eyes 12 that are loosely fitted to hanger rods 13 carried by the automobile body, and on which they are adapted to ride during the rearward and forward movements of the luggage supporting frame. When the luggage supporting frame is in extended position, the supporting rods 11 serve to uphold the outer end of the luggage supporting frame, and when the luggage supporting frame is in its forward position, the eyes of the rods 11 are held from movement on the hanger rods by anti-rattler spring arms 14, located above said hanger rods, see Fig. III.

15 designates a guard rail carried by the automobile body and located above the luggage carrier in a position that will enable it to prevent injury to the body by luggage, such as trunks, when said luggage is placed upon the luggage supporting frame.

I claim:

1. The combination, with a vehicle body provided with an underframe having side rails and a rear rail and guide bars attached to the inner sides of the side rails; of a luggage supporting frame having an inner cross bar, provided with ends adapted to slide in the guide bars, an outer cross bar, a series of longitudinal rods extending through the rear rail, and the longitudinal stop rods also extending through the rear rail and having undercut ends providing bottom shoulders and adapted to engage the rear rail when the supporting frame is drawn out.

2. The combination, with a vehicle body provided with an underframe having side rails and a rear rail and guide bars attached to the inner sides of the side rails; of a luggage supporting frame having an inner cross bar, provided with ends adapted to slide in the guide bars, an outer cross bar provided with forwardly projecting ears at its ends, a series of longitudinal rods extending through the rear rail, hanger rods secured to the sides of the vehicle body and frame supporting rods loosely mounted at their rear ends in the ears of the rear rail extending forwardly and upwardly and having eyes at their forward ends loosely fitted to the hanger rods.

3. The combination, with a vehicle body provided with an underframe having side rails and a rear rail and guide bars attached to the inner sides of the side rails; of a luggage supporting frame having an inner cross bar, provided with ends adapted to slide in the guide bars, an outer cross bar provided with forwardly projecting ears at its ends, a series of longitudinal rods extending through the rear rail, the longitudinal stop rods also extending through the rear rail and having undercut inner ends providing bottom shoulders adapted to engage the rear rail when the supporting frame is drawn out, hanger rods secured to the sides of the vehicle body and frame supporting rods loosely mounted at their rear ends in the ears of the rear rail extending forwardly and upwardly and having eyes at their forward ends loosely fitted to the hanger rods.

EDWARD T. ROBINSON.

In presence of—
A. DICKMANN,
M. H. MURPHY.